(12) United States Patent
Johnsen et al.

(10) Patent No.: US 7,402,956 B2
(45) Date of Patent: Jul. 22, 2008

(54) BALLAST WITH ZERO VOLTAGE SWITCHING CONVERTER

(75) Inventors: Andrew O. Johnsen, Danvers, MA (US); Bernhard Ertl, Munich (DE); Gerwin Thiel, Munich (DE); John Cross, Needham, MA (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 11/660,789

(22) PCT Filed: Oct. 21, 2005

(86) PCT No.: PCT/US2005/037717

§ 371 (c)(1),
(2), (4) Date: Sep. 27, 2007

(87) PCT Pub. No.: WO2006/047210

PCT Pub. Date: May 4, 2006

(65) Prior Publication Data

US 2008/0061706 A1 Mar. 13, 2008

Related U.S. Application Data

(60) Provisional application No. 60/621,213, filed on Oct. 22, 2004.

(51) Int. Cl.
 *H05B 37/02* (2006.01)

(52) U.S. Cl. .................. 315/224; 315/246; 315/291
(58) Field of Classification Search .......... 315/209 R, 315/224–226, 246–247, 291–293, 297, 307–308
See application file for complete search history.

(56) References Cited

U.S. PATENT DOCUMENTS

| 6,057,652 | A  | * | 5/2000 | Chen et al. ................ 315/307 |
| 6,300,725 | B1 | * | 10/2001 | Zinkler et al. ............. 315/291 |
| 6,469,454 | B1 | * | 10/2002 | Mader et al. .............. 315/291 |
| 6,548,966 | B2 |   | 4/2003 | Kawasaka et al. .......... 315/224 |
| 6,826,063 | B2 |   | 11/2004 | Ichikawa et al. ............ 363/41 |
| 7,095,183 | B2 | * | 8/2006 | Alexandrov ............... 315/224 |
| 2005/0225257 | A1 | * | 10/2005 | Green .................. 315/209 R |
| 2006/0006812 | A1 | * | 1/2006 | Alexandrov ............... 315/224 |

\* cited by examiner

*Primary Examiner*—Thuy Vinh Tran
*Assistant Examiner*—Tung X Le
(74) *Attorney, Agent, or Firm*—Carlo S. Bessone

(57) ABSTRACT

A ballast (10) for powering at least one gas discharge lamp (20) comprises a switching converter (100) and an inverter (900). Switching converter (100) includes a transistor (130) and a control circuit (200) that provides substantially zero voltage switching of the transistor (130) at a very high frequency. Preferably, control circuit (200) includes a drive circuit (300), a turn-on synchronization circuit (400), a current mirror circuit (500), a rail voltage regulator circuit (600), and a lamp current regulator circuit (700). Drive circuit (300) is preferably realized by a circuit arrangement that includes a standard pulse-width modulation integrated circuit (310).

13 Claims, 3 Drawing Sheets

BALLAST WITH ZERO VOLTAGE SWITCHING CONVERTER

PRIORITY CLAIM

The present application claims priority to U.S. Provisional Patent Application Ser. No. 60/621,213 (titled "Zero Voltage Switching Inverter with Low Cost PWM Controller" and filed on Oct. 22, 2004), the disclosure of which is incorporated herein by reference.

FIELD OF THE INVENTION

The present invention relates to the general subject of circuits for powering discharge lamps. More particularly, the present invention relates to a ballast that includes a switching converter having a novel control circuit for providing zero voltage switching.

BACKGROUND OF THE INVENTION

A need exists for a ballast that includes a zero voltage switching converter that is capable of operating at a very high frequency (e.g., up to 900 kilohertz) and that includes a control circuit that may be implemented using standard (i.e., "off-the-shelf") components. Zero voltage switching (ZVS) is desirable because it reduces switching power losses in the converter transistor and thus enhances the overall energy efficiency of the ballast. Standard components are preferred due to a number of practical considerations, including material cost, part availability, and design flexibility. High frequency operation is desirable because it makes possible the use of planar type magnetic components (instead of conventional core-and-bobbin type components) and the elimination of large electrolytic capacitors (which are physically large and which tend to significantly detract from the useful operating life of the ballast). Such a ballast, in comparison with existing ballasts, would provide higher energy efficiency, reduced physical size, material cost, enhanced operating life, and lower material cost, and would thus represent a significant advance over the prior art.

DETAILED DESCRIPTION OF THE PREFERRED EMBODIMENTS

Figure 1:
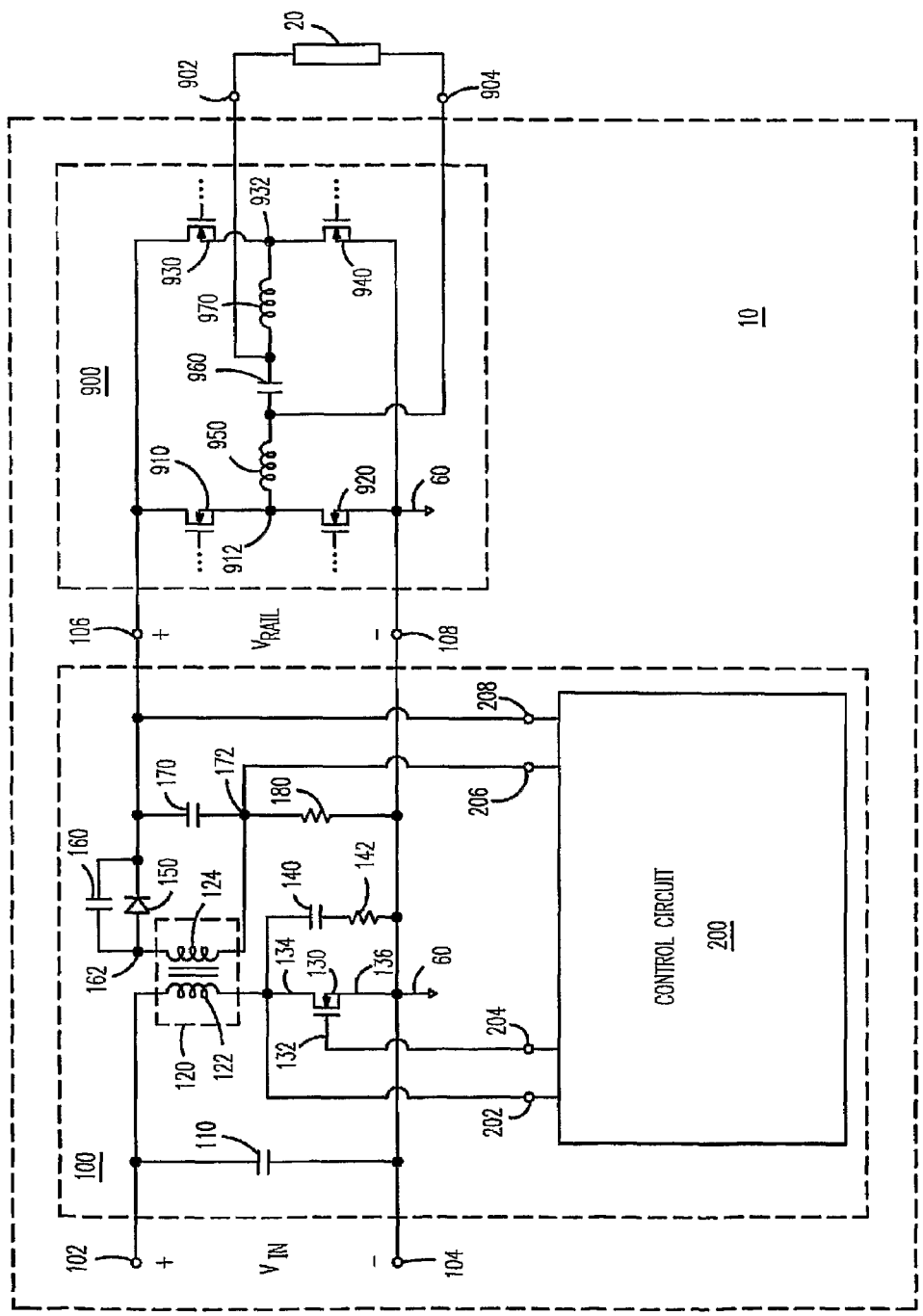
FIG. 1 is a block diagram schematic of a ballast that includes a switching converter and an inverter, in accordance with a preferred embodiment of the present invention.

FIG. 1 describes a ballast 10 for powering at least one discharge lamp 20, such as a high-intensity discharge (HID) lamp. Ballast 10 comprises a switching converter 100 and an inverter 900. During operation, switching converter 100 receives an input voltage, $V_{IN}$, and provides a substantially direct current (DC) rail voltage, $V_{RAIL}$, to inverter 900. Inverter 900 receives $V_{RAIL}$ and provides periodically alternating output voltage and output current for igniting and powering lamp 20.

As described in FIG. 1, switching converter 100 is preferably realized as flyback type converter comprising first and second input terminals 102,104, first and second output terminals 106,108, a first capacitor 110, a transformer 120, a transistor 130, a series combination of a second capacitor 140 and a first resistor 142, a diode 150, a third capacitor 160, a fourth capacitor 170, a second resistor 180, and a control circuit 200. First capacitor 110 is coupled between first and second input terminals 102,104. Second input terminal 104 and second output terminal 108 are each coupled to circuit ground 60. Transformer 120 includes a primary winding 122 and a secondary winding 124. Transistor 130 is coupled in series with primary winding 122 of transformer 120, and is preferably implemented by a N-channel field effect transistor (FET) having a gate terminal 132, a drain terminal 134, and a source terminal 136. Primary winding 122 of transformer 120 is coupled between first input terminal 102 and drain 134 of FET 130. Source 136 of FET 130 is coupled to circuit ground 60. The series combination of second capacitor 140 and first resistor 142 is coupled between drain terminals 134 and circuit ground 60. Secondary winding 124 of transformer 120 is coupled between a first node 162 and a second node 172. Diode 150 and third capacitor 160 are each coupled between first node 162 and first output terminal 106. Fourth capacitor 170 is coupled between first output terminal 106 and second node 172. Finally, second resistor 180 is coupled between second node 172 and circuit ground 60.

During operation of switching converter 100, FET 130 is turned on and off in a controlled manner by control circuit 200 so as to provide a regulated DC rail voltage (i.e., $V_{RAIL}$, which is typically designed to be on the order of about 400 volts), as well as a limited current, to inverter 900 for powering lamp 20 at a desired level. Control circuit 200 further operates to provide substantially zero voltage switching of FET 130, thereby minimizing the switching power losses in FET 130 and enhancing the overall energy efficiency of ballast 10. Additionally, control circuit 200 is intended to drive FET 130 at a very high frequency (e.g., 900 kilohertz) so as to allow for the use of planar magnetic components (e.g., for implementing transformer 120) and to eliminate any need for large electrolytic capacitors (e.g., for implementing capacitor 170), thereby reducing the size and weight, and enhancing the expected operating life, of ballast 10.

As described in FIG. 1, inverter 900 is preferably implemented as a full-bridge type inverter having first and second output connections 902,904, first, second, third, and fourth transistors 910,920,930,940 (preferably implemented by N-channel FETs), first and second inductors 950,970, and a capacitor 960. FET 910 is coupled between first output terminal 106 (of converter 100) and a first node 912. FET 920 is coupled between first node 912 and circuit ground 60. FET 930 is coupled between first output terminal 106 (of converter 100) and a second node 932. FET 940 is coupled between second node 932 and circuit ground 60. First inductor 950 is coupled between first node 912 and second output connection 904. Capacitor 90 is coupled between first and second output connections 902,904. Finally, second inductor 970 is coupled between second node 932 and first output connection 902.

It should be understood that inverter 900 requires an inverter driver circuit (not shown or described in FIG. 1) for commutating FETs 910,920,930,940 in a controlled complementary fashion (i.e., so that when FETs 910,940 are on, FETs 920,930 are off, and vice-versa). An appropriate driver circuit for inverter 900 may be realized by any of a number of arrangements that are well known to those skilled in the art of lighting ballasts and/or power supplies.

Referring again to FIG. 1, control circuit 200 includes first, second, third, and fourth connections 202,204,206,208 that are coupled to different points within switching converter 100. More specifically, first connection 202 is coupled to drain terminal 134 of FET 130, second connection 204 is coupled to gate terminal 132 of FET 130, third connection 206 is coupled to second node 172, and fourth connection 208 is coupled to first output terminal 208. During operation, control circuit 200 monitors, via first connection 202, the voltage, $V_{DS}$, between the drain and source terminals 134,136 of FET 130 when FET 130 is off. Control circuit also monitors, via first connection 202, the current, $I_P$, that flows through primary winding 122 of transformer 120 when FET 130 is on. A control signal for switching FET 130 on and off is provided by control circuit 200 via second connection 204. Control circuit 200 monitors, via third connection 206, the voltage across resistor 180; the voltage across resistor 180 is proportional to the output current provided by switching converter 100 and is related to the amount of current ultimately provided to lamp 20 by inverter 900. Finally, control circuit 200 monitors the DC rail voltage, $V_{RAIL}$, by way of fourth connection 208.

Figure 2:
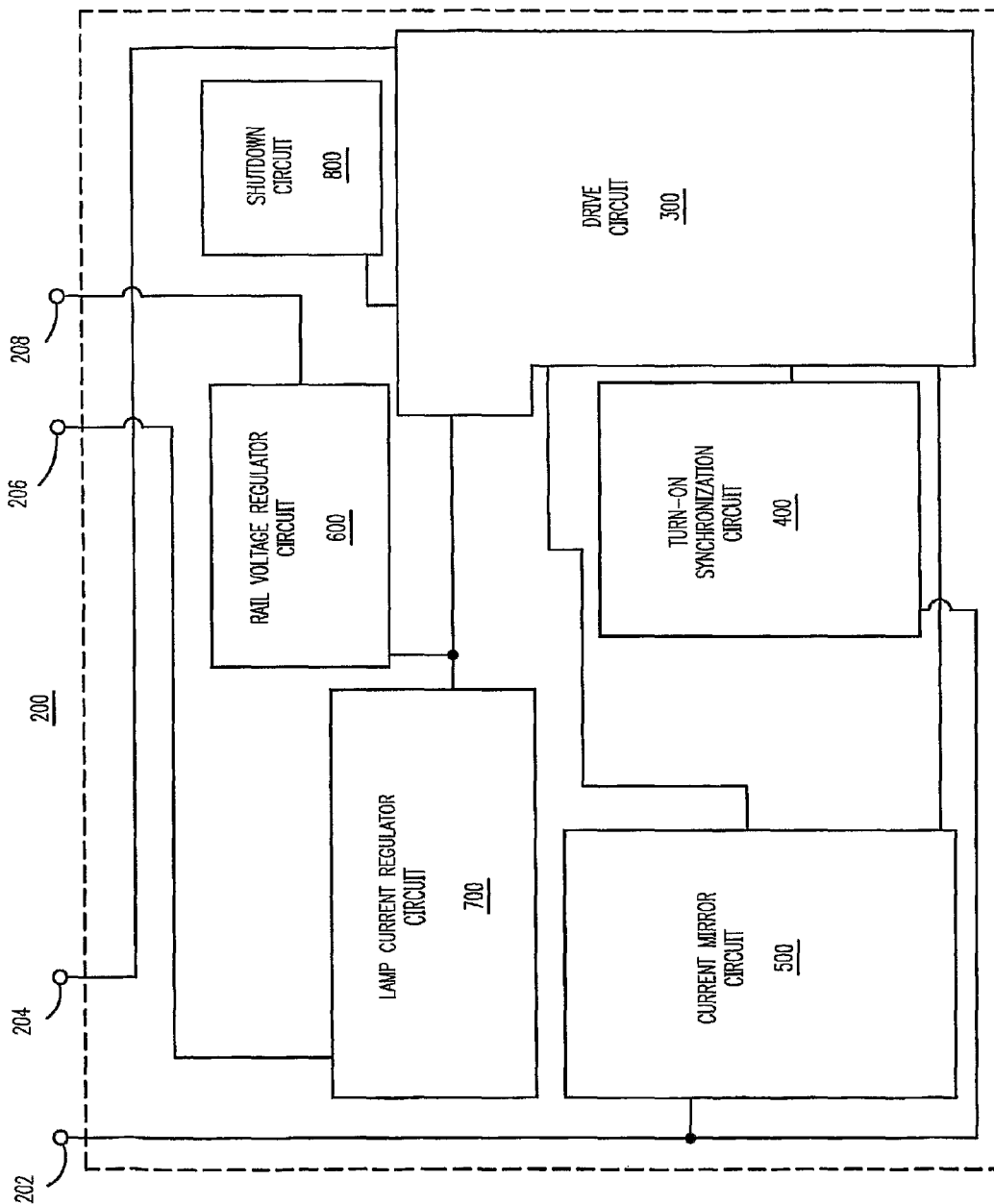
FIG. 2 is a block-diagram schematic of a control circuit for the switching converter described in FIG. 1, in accordance with a preferred embodiment of the present invention.

Referring now to FIG. 2, in a preferred embodiment of the present invention, control circuit 200 comprises a plurality of sub-circuits that includes a drive circuit 300, a turn-on synchronization circuit 400, a current mirror circuit 500, a rail voltage regulator circuit 600, a lamp current regulator circuit 700, and (optionally) a shutdown circuit 800. Preferred circuitry for realizing each of the sub-circuits 300,400,500,600, 700,800 is described in FIG. 3.

As illustrated in FIG. 2, drive circuit 300 is coupled to each of the other sub-circuits 400,500,600,700,800 and to second connection 204 of control circuit 200. During operation, drive circuit 300 provides the control voltage (for switching FET 130 on and off) via second connection 204.

Turn-on synchronization circuit 400 is coupled to drive circuit 300 and to first connection 202. During operation, turn-on synchronization circuit 400 monitors, via first connection 202, the drain-to-source voltage (VDS) of FET 130 during the periods when FET 130 is off. When VDS swings low, turn-on synchronization circuit 400 directs drive circuit 300 to provide a positive control voltage (e.g., +10 volts or so) to switch FET 130 on. In this way, control circuit 200 provides energy efficient zero voltage switching of FET 130.

Current mirror circuit 500 is coupled to drive circuit 300 and to first connection 202. During operation, current mirror circuit 500 effectively monitors, via first connection 202, the current that flows through primary winding 122 of transformer 120 during the periods when FET 130 is on. When the current through primary winding 122 reaches a predetermined peak threshold, current mirror circuit 500 directs drive circuit 300 to provide an approximately zero control voltage to switch FET 130 off. Advantageously, current mirror circuit 500 allows control circuit 200 to provide current-mode type control without requiring the presence of either a dissipative current-sensing resistor or an expensive current transformer. Thus, current mirror circuit enhances the energy efficiency and low material cost of ballast 10.

Rail voltage regulator circuit 600 is coupled to fourth connection 208 and drive circuit 300. During operation, rail voltage regulator circuit 600 monitors $V_{RAIL}$ via fourth connection 208 and directs drive circuit 300 to adjust a duty cycle of the control voltage provided to FET 130 in order to maintain (regulate) $V_{RAIL}$ at a predetermined desired level (e.g., 400 volts).

Lamp current regulator circuit 700 is coupled to third connection 206 and drive circuit 300. During operation, lamp current regulator circuit 700 monitors, via third connection 206, the voltage across resistor 180 (which, as previously explained, is indicative of the amount of current supplied to lamp 20), and directs drive circuit 300 to adjust the duty cycle of the control voltage provided to FET 130 in order to maintain (regulate) the lamp current at a pre-specified desired level.

Shutdown circuit 800 is coupled to drive circuit 300. During operation, in response to a shutdown command (e.g., as provided by external protection circuitry, which is not shown or described herein, within switching converter 100 or inverter 900), shutdown circuit 800 directs drive circuit 300 to cease switching of FET 130, thereby protecting ballast 10 from possible damage in the event of a fault condition. It should be appreciated that shutdown circuit 800 is optional, as it is not required in order for control circuit 200 to serve its primary purpose of providing high frequency zero voltage switching.

Preferred circuitry for implementing control circuit 200 is now explained with reference to FIG. 3, as follows:

Drive circuit 300 preferably comprises a pulse-width modulation integrated circuit (PWM IC) 310, a first resistor 330, a first capacitor 332, a transistor 340, a diode 350, a second resistor 360, a third resistor 362, a fourth resistor 364, and a capacitor 370. PWM IC 310 comprises a first, second, third, fourth, fifth, sixth, seventh, and eight pins 312,314,316, 318,320,322,324,326. Preferably, PWM IC 310 is realized by a commercially available integrated circuit, such as the UCC2803 pulse width modulation integrated circuit. The functions of the eight pins of PWM IC 310 are denoted by the text labels in FIG. 3, and are well understood by those skilled in the art; for example, first pin 312 is labeled "COMP," second pin 314 is labeled "$V_{FB}$," and so forth. Fifth pin 320 (labeled "GND") is coupled to circuit ground 60. Seventh pin 324 (labeled "$V_{CC}$") is coupled to a DC supply voltage, $V_{CC}$, which is typically chosen to be on the order of about 12 volts. Eighth pin 326 is coupled to a reference voltage, $V_{REF}$, which is typically chosen to be on the order of about 4 volts. First resistor 330 and first capacitor 332 are each coupled between first and second pins 312,314 of PWM IC 310. Transistor 340 is preferably implemented by a N-channel field effect transistor (FET) having a gate 342, a drain 344, and a source 346. Source 346 is coupled to circuit ground 60. Diode 350 is coupled between the reference voltage, $V_{REF}$, and fourth pin 318 (labeled "$R_T/C_T$") of PWM IC 310. Second resistor 360 is coupled between diode 350 and drain 344 of FET 340. Third resistor 362 is coupled between a first node 372 and circuit ground 60. Fourth resistor 364 is coupled between gate 342 of FET 340 and sixth pin 322 (labeled "OUT") of PWM IC 310. Finally, capacitor 370 is coupled between first node 372 and drain 344 of FET 340.

During operation of drive circuit 300, the RC time constant of resistor 360 and capacitor 370 places a limit upon the maximum time that transistor 130 can remain off.

Referring again to FIG. 3, turn-on synchronization circuit 400 preferably comprises a transistor 410, a diode 420, a first resistor 430, a first capacitor 440, a second resistor 432, and a series combination of a third resistor 434 and a second capacitor 442. Transistor 410 is preferably implemented by a PNP type bipolar junction transistor (BJT) having a base 412, a collector 414, and an emitter 416. Emitter 416 is coupled to DC supply voltage, $V_{CC}$. Diode 420 and first resistor 430 are each coupled between emitter 416 and base 412 of BJT 410. First capacitor 440 is coupled between collector 414 of BJT 410 and first node 372 of drive circuit 300. Second resistor 432 is coupled between collector 414 of BJT 410 and circuit ground 60. The series combination of third resistor 434 and second capacitor 442 is coupled between base 412 of BJT 410 and first connection 202 of control circuit 200.

Figure 3:
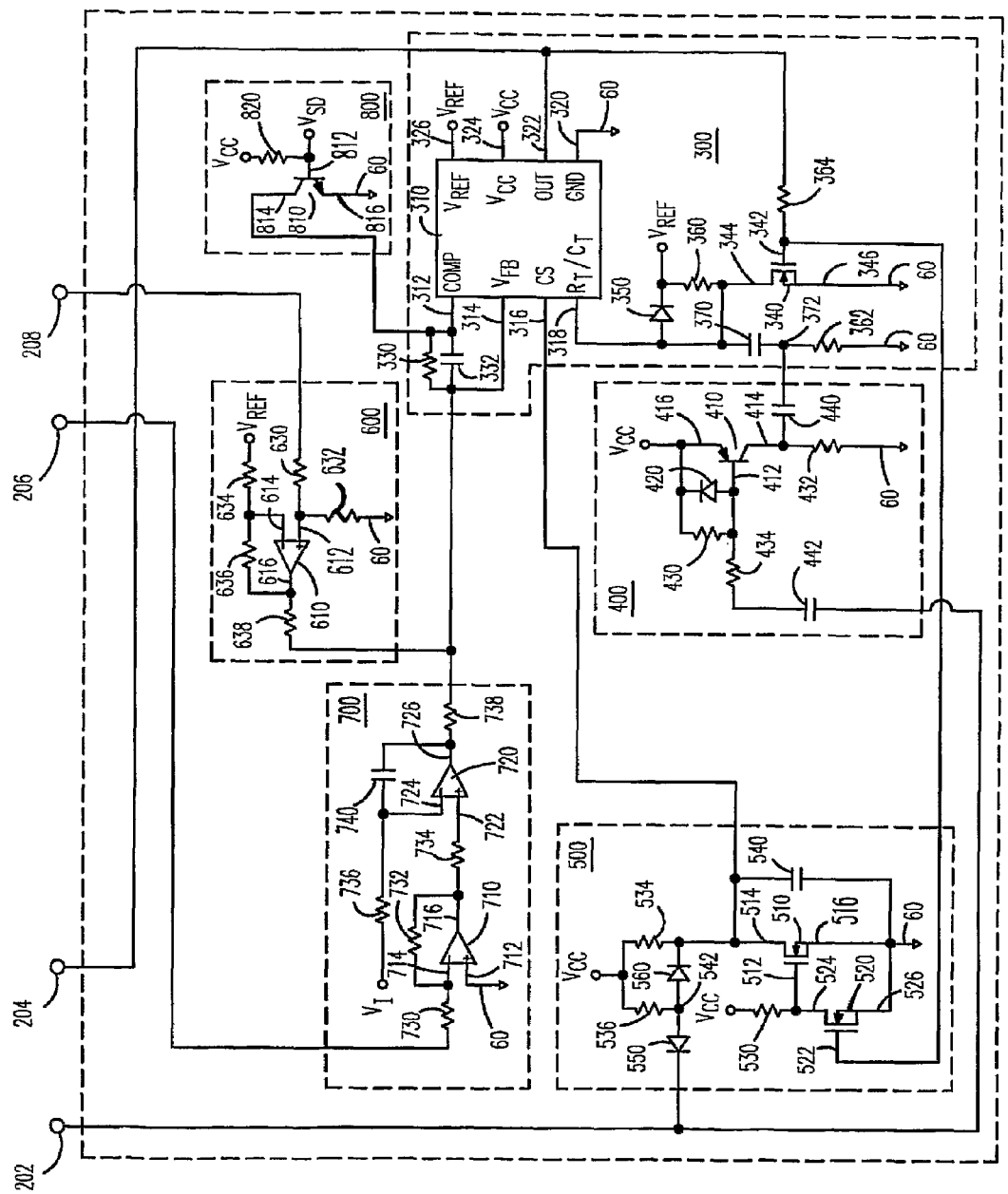
FIG. 3 is a detailed electrical schematic of the control circuit described in FIG. 2, in accordance with a preferred embodiment of the present invention.

As described in FIG. 3, current mirror circuit 500 preferably comprises a first transistor 510, a second transistor 520, a first resistor 530, a second resistor 534, a third resistor 536, a capacitor 540, a first diode 550, and a second diode 560. First transistor 510 is preferably implemented by a N-channel field effect transistor (FET) having a gate 512, a drain 514, and a source 516. Source 516 is coupled to circuit ground 60, and drain 514 is coupled to third pin 316 (labeled "CS") of PWM IC 310 of drive circuit 300. Second transistor 520 is preferably implemented by a N-channel field effect transistor (FET) having a gate 522, a drain 524, and a source 526. Source 526 is coupled to circuit ground 60, and drain 524 is coupled to gate 512 of FET 510. First resistor 530 is coupled between the DC supply voltage, $V_{CC}$, and gate 512 of FET 510. Second resistor 534 is coupled between the DC supply voltage, $V_{CC}$, and drain 514 of FET 510. Third resistor 536 is coupled between the DC supply voltage, $V_{CC}$, and a first node 542. Capacitor 540 is coupled between drain 514 and source 516 of FET 510. First diode 550 is coupled between first node 542 and first connection 202 of control circuit 200. Second diode 560 is coupled between first node 542 and drain 514 of FET 510.

During operation of current mirror circuit 500, the RC time constant of resistor 534 and capacitor 540 places a limit upon the maximum time that transistor 130 can remain on.

Referring again to FIG. 3, rail voltage regulator circuit 600 preferably comprises an operational amplifier (OP AMP) 610, a first resistor 630, a second resistor 632, a third resistor 634, a fourth resistor 636, and a fifth resistor 638. OP AMP 610 has a non-inverting input 612, an inverting input 614, and an output 616. First resistor 630 is coupled between non-inverting input 612 and fourth connection 208 of control circuit 200. Second resistor 632 is coupled between non-inverting input 612 and circuit ground 60. Third resistor 634 is coupled between the reference voltage, $V_{REF}$, and inverting input 614. Fourth resistor 636 is coupled between inverting input 614 and output 616. Fifth resistor 638 is coupled between output 616 and second pin 314 (labeled "VFB") of PWM IC 310 of drive circuit 300.

As described in FIG. 3, lamp current regulator circuit 700 preferably comprises a first operational amplifier (OP AMP) 710, a second OP AMP 720, a first resistor 730, a second resistor 732, a third resistor 734, a fourth resistor 736, a capacitor 740, and a fifth resistor 738. First OP AMP 710 has a non-inverting input 712, an inverting input 714, and an output 716. Non-inverting input 712 is coupled to circuit ground 60. Second OP AMP 720 has a non-inverting input 722, an inverting input 724, and an output 726. First resistor 730 is coupled between inverting input 714 of first OP AMP 710 and third connection 206 of control circuit 200. Second resistor 732 is coupled between inverting input 714 of OP AMP 710 and output 716 of OP AMO 710. Third resistor 734 is coupled between output 716 of OP AMP 710 and non-inverting input 722 of OP AMP 720. Fourth resistor 736 is coupled between a lamp current reference voltage, $V_I$, and inverting input 724 of OP AMP 720; the lamp current reference voltage, $V_I$, is provided by other circuitry (not shown or described herein) within ballast 10 in order to specify a desired level for the current provided to lamp 20. Capacitor 740 is coupled between inverting input 724 of OP AMP 720 and output 726 of OP AMP 720. Fifth resistor 738 is coupled between output 726 of OP AMP 720 and second pin 314 (labeled "VFB") of PWM IC 310 of drive circuit 300.

Referring again to FIG. 3, shutdown circuit 800 preferably comprises a transistor 810 and a resistor 820. Transistor 810 is preferably realized by a NPN-type bipolar junction transistor having a base 812, a collector 814, and an emitter 816. Base 812 is coupled to a shutdown signal, VSD, that is provided by protective circuitry (not shown or described herein) within switching converter 100 or inverter 900. Collector 814 is coupled to first pin 312 (labeled "COMP") of PWM IC 310 of drive circuit 300. Emitter 816 is coupled to circuit ground 60. Resistor 820 is coupled between the DC supply voltage, $V_{CC}$, and base 812 of transistor 810.

Although the present invention has been described with reference to certain preferred embodiments, numerous modifications and variations can be made by those skilled in the art without departing from the novel spirit and scope of this invention.

What is claimed is:

1. A ballast for powering at least one discharge lamp, comprising:

an inverter having output connections adapted for coupling to the at least one discharge lamp; and a switching converter for providing a substantially direct current (DC) rail voltage, comprising:

first and second input terminals for receiving an input voltage;

first and second output terminals coupled to the inverter, wherein the DC rail voltage is provided between the first and second output terminals;

a transformer having a primary winding and a secondary winding;

a transistor having a gate terminal, a drain terminal, and a source terminal, wherein the drain terminal is coupled to the primary winding of the transformer and the source terminal is coupled to circuit ground; and a control circuit coupled to the transistor and operable to provide substantially zero voltage switching (ZVS) of the transistor, the control circuit comprising:

a first connection coupled to the drain terminal of the transistor, a second connection coupled to the gate terminal of the transistor, a third connection coupled to the secondary winding of the transformer, and a fourth connection coupled to the first output terminal;

a drive circuit coupled to the first and second connections, and operable to provide an output signal for turning the transistor on and off;

a turn-on synchronization circuit coupled to the first connection and to the drive circuit, wherein the turn-on synchronization circuit is operable to monitor a voltage between the drain and source terminals of the transistor and, in response to the voltage between the drain and source terminals approaching zero, to direct the drive circuit to turn the transistor on;

a current mirror circuit coupled to the first connection and to the drive circuit, wherein the current mirror circuit is operable to monitor a current through the primary winding of the transformer and, in response to the current through the primary winding reaching a predetermined peak level, to direct the drive circuit to turn the transistor off;

a rail voltage regulator circuit coupled to the fourth connection and to the drive circuit, wherein the rail voltage regulator circuit is operable to monitor the rail voltage and to control the output signal of the drive circuit so as to maintain the rail voltage at a first predetermined level; and a lamp current regulator circuit coupled to the third connection and to the drive circuit, wherein lamp current regulator circuit is operable to monitor the output current of the switching converter and to control the output signal of the drive circuit so as to maintain the output current at a second predetermined level.

2. The ballast of claim 1, wherein:
the secondary winding of the transformer is coupled between a first node and a second node;
the switching converter further comprises:
a first capacitor coupled between the first and second input terminals;
a series combination of a second capacitor and a first resistor, the series combination being coupled between the drain terminal of the transistor and circuit ground;
a diode coupled between the first node and the first output terminal;
a third capacitor coupled between the first node and the first output terminal;
a fourth capacitor coupled between the first output terminal and the second node; and
a second resistor coupled between the second node and circuit ground; and
the third connection of the control circuit is coupled to the second node.

3. The ballast of claim 1, wherein the drive circuit comprises:
a pulse-width modulation integrated circuit (PWM IC) comprising first, second, third, fourth, fifth, sixth, seventh, and eighth pins, wherein the fifth pin is coupled to circuit ground, the seventh pin is coupled to a DC supply voltage, and the eighth pin is coupled to a reference voltage;
a first resistor coupled between the first and second pins of the PWM IC;
a first capacitor coupled between the first and second pins of the PWM IC;
a transistor having a gate, a drain, and a source, wherein the source is coupled to circuit ground;
a diode coupled between the reference voltage and the fourth pin of the PWM IC;
a second resistor coupled between the diode and the drain of the transistor;
a third resistor coupled between a first node and circuit ground;
a fourth resistor coupled between the gate of the transistor and the sixth pin of the PWM IC; and
a capacitor coupled between the first node and the drain of the transistor.

4. The ballast of claim 3, wherein the transistor of the drive circuit is a N-channel field effect transistor.

5. The ballast of claim 3, wherein the turn-on synchronization circuit comprises:
a transistor having a base, a collector, and an emitter, wherein the emitter is coupled to the DC supply voltage;
a diode coupled between the emitter and the base of the transistor;
a first resistor coupled between the emitter and the base of the transistor;
a first capacitor coupled between the collector of the transistor and the first node of the drive circuit;
a second resistor coupled between the collector of the transistor and circuit ground; and
a series combination of a third resistor and a second capacitor coupled between the base of the transistor and the first connection of the control circuit.

6. The ballast of claim 5, wherein the transistor of the turn-on synchronization circuit is PNP-type bipolar junction transistor.

7. The ballast of claim 3, wherein the current mirror circuit comprises:
a first transistor having a gate, a drain, and a source, wherein the source is coupled to circuit ground and the drain is coupled to the third pin of the PWM IC of the drive circuit;
a second transistor having a gate, a drain, and a source, wherein the source is coupled to circuit ground and the drain is coupled to the gate of the first transistor;
a first resistor coupled between the DC supply voltage and the gate of the first transistor;
a second resistor coupled between the DC supply voltage and the drain of the first transistor;
a third resistor coupled between the DC supply voltage and a first node;
a capacitor coupled between the drain and the source of the first transistor;
a first diode coupled between the first node and the first connection of the control circuit; and
a second diode coupled between the first node and the drain of the first transistor.

8. The ballast of claim 7, wherein the first transistor and the second transistor of the current mirror circuit are each N-channel field effect transistors.

9. The ballast of claim 3, wherein the rail voltage regulator circuit comprises:
an operational amplifier having a non-inverting input, an inverting input, and an output;
a first resistor coupled between the fourth connection of the control circuit and the non-inverting input of the operational amplifier;
a second resistor coupled between the non-inverting input of the operational amplifier and circuit ground;
a third resistor coupled between the reference voltage and the inverting input of the operational amplifier;
a fourth resistor coupled between the inverting input and the output of the operational amplifier; and
a fifth resistor coupled between the output of the operational amplifier and the second pin of the PWM IC of the drive circuit.

10. The ballast of claim 3, wherein the lamp current regulator circuit comprises:
a first operational amplifier having a non-inverting input, an inverting input, and an output, wherein the non-inverting input is coupled to circuit ground;
a second operational amplifier having a non-inverting input, an inverting input, and an output;
a first resistor coupled between the third connection of the control circuit and the inverting input of the first operational amplifier;
a second resistor coupled between the inverting input of the first operational amplifier and the output of the first operational amplifier;
a third resistor coupled between the output of the first operational amplifier and the non-inverting input of the second operating amplifier;
a fourth resistor coupled between a lamp current reference voltage and the inverting input of the second operational amplifier;
a capacitor coupled between the inverting input of the second operational amplifier and the output of the second operational amplifier; and a fifth resistor coupled between the output of the second operational amplifier and the second pin of the PWM IC of the drive circuit.

11. The ballast of claim 3, wherein the control circuit further comprises a shutdown circuit that is operable, in response to a shutdown command, to direct the drive circuit to cease switching of the transistor of the switching converter.

12. The ballast of claim 11, wherein the shutdown circuit comprises:
   a transistor having a base, a collector, and an emitter, wherein the base is coupled to a shutdown signal, the collector is coupled to the first pin of the PWM IC of the drive circuit, and the emitter is coupled to circuit ground; and
   a resistor coupled between the DC supply voltage and the base of the transistor.

13. The ballast of claim 12, wherein the transistor of the shutdown circuit is a NPN-type bipolar junction transistor.

* * * * *